United States Patent
Yan

(10) Patent No.: US 7,428,276 B2
(45) Date of Patent: Sep. 23, 2008

(54) METHOD AND APPARATUS FOR CHANNEL IMPULSE RESPONSE ESTIMATION IN GSM SYSTEMS

(75) Inventor: Liang Yan, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 575 days.

(21) Appl. No.: 10/907,376

(22) Filed: Mar. 30, 2005

(65) Prior Publication Data

US 2006/0062333 A1    Mar. 23, 2006

(30) Foreign Application Priority Data

Sep. 17, 2004    (TW) .............................. 93128341 A

(51) Int. Cl.
*H03D 1/00*    (2006.01)
(52) U.S. Cl. ................. 375/343; 375/341; 375/340; 375/232; 375/348; 348/726; 342/189
(58) Field of Classification Search ................. 348/726; 342/189; 379/406.08; 370/349, 286; 375/343, 375/341, 340, 232, 348
See application file for complete search history.

(56) References Cited

U.S. PATENT DOCUMENTS

| | | | |
|---|---|---|---|
| 5,805,107 A | * | 9/1998 | Schroth et al. .............. 342/189 |
| 6,459,728 B1 | | 10/2002 | Bar-David et al. |
| 7,242,762 B2 | * | 7/2007 | He et al. ................. 379/406.08 |
| 2004/0001450 A1 | * | 1/2004 | He et al. ...................... 370/286 |
| 2005/0105505 A1 | * | 5/2005 | Fishler et al. ............... 370/349 |
| 2007/0229713 A1 | * | 10/2007 | Markman et al. ........... 348/726 |

* cited by examiner

*Primary Examiner*—Chieh M. Fan
*Assistant Examiner*—Sudhanshu C. Pathak
(74) *Attorney, Agent, or Firm*—Winston Hsu

(57) ABSTRACT

A method for estimating channel impulse response (CIR) in a communication system includes converting RF analog signals to obtain baseband digitized signals, sampling the baseband digitized signals according to the symbol period or bit period, cross-correlating at least part of the samples and a predetermined set of training sequence symbols, and calculating the ratio of the maximum square of the modulus (power) value and the second largest value among the outputs of the cross-correlations. If the ratio is larger than a first predetermined value, the method outputs the cross-correlation values as the CIR according to the time step index of the maximum power value, and if the ratio is not larger than the first predetermined value, the method calculates the energy of a predetermined window and outputs the cross-correlation values as the CIR according to the time step index of the maximum energy.

23 Claims, 4 Drawing Sheets

METHOD AND APPARATUS FOR CHANNEL IMPULSE RESPONSE ESTIMATION IN GSM SYSTEMS

BACKGROUND OF INVENTION

1. Field of the Invention

The present invention relates to a method and an apparatus for channel impulse response estimation, and more particularly, to a method and an apparatus for channel impulse response estimation in global system for mobile communications (GSM).

2. Description of the Prior Art

As transmission rates increase, inter-symbol interference (ISI) due to multi-path propagation becomes one of the most serious problems in digital communication systems. The fading effect brought by multi-path propagation is a phenomenon of reflection and refraction of radio waves during propagation along different paths. The signals transmitted from the transmitter reach the receiver along different paths. These signals from different paths have various time delays and grades of attenuation. Hence the signals are affected by preceding and posterior signals, which is called inter-symbol interference. For the transmission distortion, the receiver of communication systems must estimate the characteristic of the channel and perform equalization relative to the channel in order to compensate the distorted signals and to obtain the correct signals. The compensation of channel distortion is evaluated by the accuracy of the channel estimation. For digital signals destroyed by additive white Gaussian noise (AWGN) and ISI, the maximum-likelihood sequence equalization (MLSE) is a well-known optimized equalization technique. For example, a method of channel estimation according to MLSE was introduced in U.S. Pat. No. 6,459,728 "Iterative Channel Estimation". However, in most mobile communication systems, the channel impulse response (CIR), which is needed in the MLSE algorithm, is time-varying and unknown because of the relative move between the mobile station and the environment. Therefore, the estimation of parameters in CIR is the most important task for the equalization and channel estimation of receivers. Generally speaking, in receivers of the Global System for Mobile Communications (GSM), the CIR is estimated by utilizing known training sequence symbols.

SUMMARY OF INVENTION

It is therefore a primary objective of the claimed invention to provide a method and a receiver for channel impulse response estimation for both a AWGN channel and a fading channel.

Briefly described, the claimed invention discloses a method for estimating the channel impulse response (CIR) in a communication system. The method includes converting received RF analog signals to obtain baseband digitized signals, sampling the baseband digitized signals over a time according to the symbol period or the bit period, and cross-correlating at least part of the samples and a predetermined set of training sequence symbols; calculating the ratio of the maximum value and the second largest value among the squares of the modulus of the outputs of the cross-correlations if there are a plurality of peak values among the outputs of the cross-correlation; and outputting the cross-correlation values as the CIR according to the time step index of the maximum cross-correlation and the adjacent time step indices if the ratio is larger than a first value.

The method includes converting received RF analog signals to obtain baseband digitized signals, sampling the baseband digitized signals over a time according to the symbol period or the bit period, and cross-correlating at least part of the samples and a predetermined set of training sequence symbols; calculating the ratio of the maximum value and the second largest value among the squares of the modulus of the outputs of the cross-correlations if there are a plurality of peak values among the outputs of the cross-correlation; and calculating energy of an interval of a predetermined length according to the outputs of the cross-correlation, and outputting the cross-correlation value as the CIR according to the beginning time step index of the interval of the predetermined length of which the maximum energy and the time step indices following the beginning time step index if the ratio is not larger than a first value.

The method includes converting received RF analog signals to obtain baseband digitized signals, sampling the baseband digitized signals over a time according to the symbol period or bit period, and cross-correlating at least part of the samples and a predetermined set of training sequence symbols; calculating a number of peak values among the outputs of the cross-correlations; and outputting the cross-correlation values as the CIR according to the time step index of the maximum output of the cross-correlation and the time step indices adjacent to the time step index of the maximum output of the cross-correlation if there is only one peak value among the outputs of the cross-correlation.

The claimed invention further discloses a receiver of a communication system. The receiver includes a memory for storing a predetermined set of training sequence symbols; a cross-correlator coupled to the memory for performing a predetermined cross-correlation to samples of received symbols and the predetermined set of training sequence symbols; a peak counter for counting a number of peak values among outputs of the cross-correlator; a peak ratio comparator coupled to the peak counter for comparing a ratio of the maximum value and the second largest value among the squares of the modulus of the outputs of the cross-correlator with a first value if there are a plurality of peak values among the outputs of the cross-correlator; a module for counting values besides the peak, the module coupled to the peak counter and the peak ratio comparator for outputting the symbol of which the cross-correlator outputs the maximum value according to the time step index and symbols adjacent to the symbol as the CIR when there is only one peak value according to the outputs of the cross-correlator or when there are a plurality of peak values among the outputs of the cross-correlator, but the ratio of the maximum square of the modulus value and the second largest square of the modulus value among the outputs of the cross-correlator is larger than a first value; and a module for counting N correlation values of the maximum energy, the module coupled to the peak ratio comparator for calculating energy of an interval of a predetermined length according to the outputs of the cross-correlator, and outputting the symbol of which the time step index is the beginning time step index of the interval of the predetermined length of the maximum energy and the adjacent symbols as the CIR, when there are a plurality of peak values among the outputs of the cross-correlator and the ratio of the maximum square of the modulus value and the second largest square of the modulus value among the outputs of the cross-correlator is not larger than the first value.

These and other objectives of the present invention will no doubt become obvious to those of ordinary skill in the art after

DETAILED DESCRIPTION

Generally, it is assumed that the Gaussian minimum shift keying (GMSK) system linearly approximates the quarter phase shift keying (QPSK) system. Therefore a QPSK system with a Gaussian filter can be treated as a channel model in a GSM system. The corresponding channel coefficients can be obtained by cross-correlating the outputs of the channel with known training sequence symbols. There are a lot of different methods utilizing this kind of methodology to obtain the CIR with the known training sequence symbols. For instance, both searching the peak of the cross-correlations and calculating the energy are often utilized to estimate the CIR, and these two kinds of methodologies have been published and issued extensively already. The reason that the known training sequence can be utilized to determine the CIR is that the training sequence adopted in digital communication systems is usually designed to be highly self-correlated and similar to uncorrelated white noise. Therefore, when the received symbols are synchronized, a peak will appear among the cross-correlations of the synchronized symbols and the training sequence.

Figure 1:
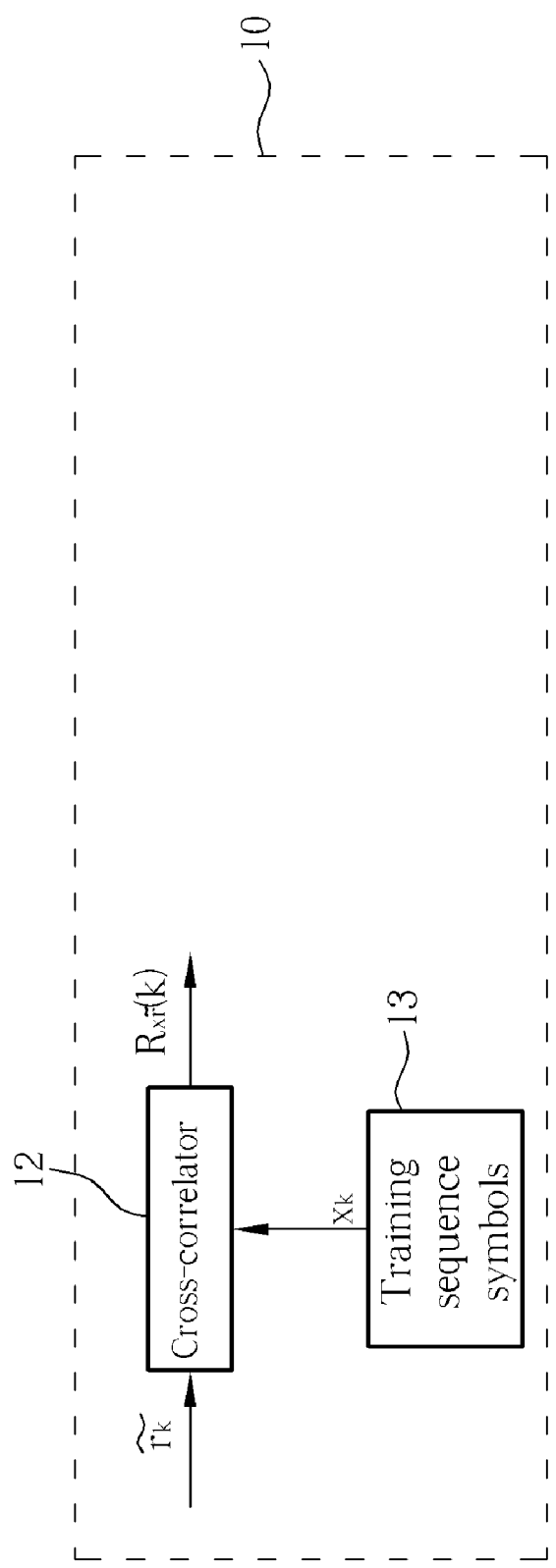
FIG. 1 is a block diagram of a first receiver of a communication system.

Please refer to FIG. 1. FIG. 1 is a block diagram of a first receiver 10 of communication systems. The receiver 10 includes a cross-correlator 12 and a training sequence symbol 13. The training sequence symbol 13 is coupled to the cross-correlator 12. In FIG. 1, $\tilde{r}_k$ is generated by sampling the received signals and having a sampling rate four times the frequency of the received signals, which means the duration of $\tilde{r}_k$ is a quarter of the bit duration or the symbol duration of the received signal. $x_k$ is generated by sampling the original training sequence and having a sampling rate four times the frequency of the original training sequence. k is time step index, and L represents the length of the training sequence. As illustrated in FIG. 1, $x_k$ and $\tilde{r}_k$ are input to the cross-correlator 12 for cross-correlation, wherein $\tilde{r}_k$ should include a section identical to $x_k$. Therefore, the output of the cross-correlator 12 can be represented by:

$$R_{X\tilde{Y}}(k) = \frac{1}{L}\sum_{i=1}^{L} x^*_{L-i}\tilde{r}_{k+4(L-i)} \quad \text{eq. (1)}$$

wherein $x^*_{L-i}$ is the complex conjugate of $x_{L-i}$.

For detecting the location of the training sequence among the received signals, the length of $\tilde{r}_k$ should be longer than the length of $x_k$. In the prior art, it is utilized to set the sample corresponding to the k which makes the value of $|R_{X\tilde{Y}}(k)|$ the largest, that is, the modulus of the output of the cross-correlator 12, as the starting point of the training sequence of the received signals, and output the CIR accordingly. However, because the characteristics of GSM channels are time-varying and the GSM channels are fading channels, the location of the peak of the modulus of the cross-correlation does not represent the location of the training sequence for different bursts. Hence, it is very possible that the channel equalization cannot be achieved if the time step index of the peak value of the modulus of the cross-correlation (the k that makes $|R_{X\tilde{Y}}(k)|$ the maximum) is set as the starting point of the training sequence of the bursts directly.

Figure 2:
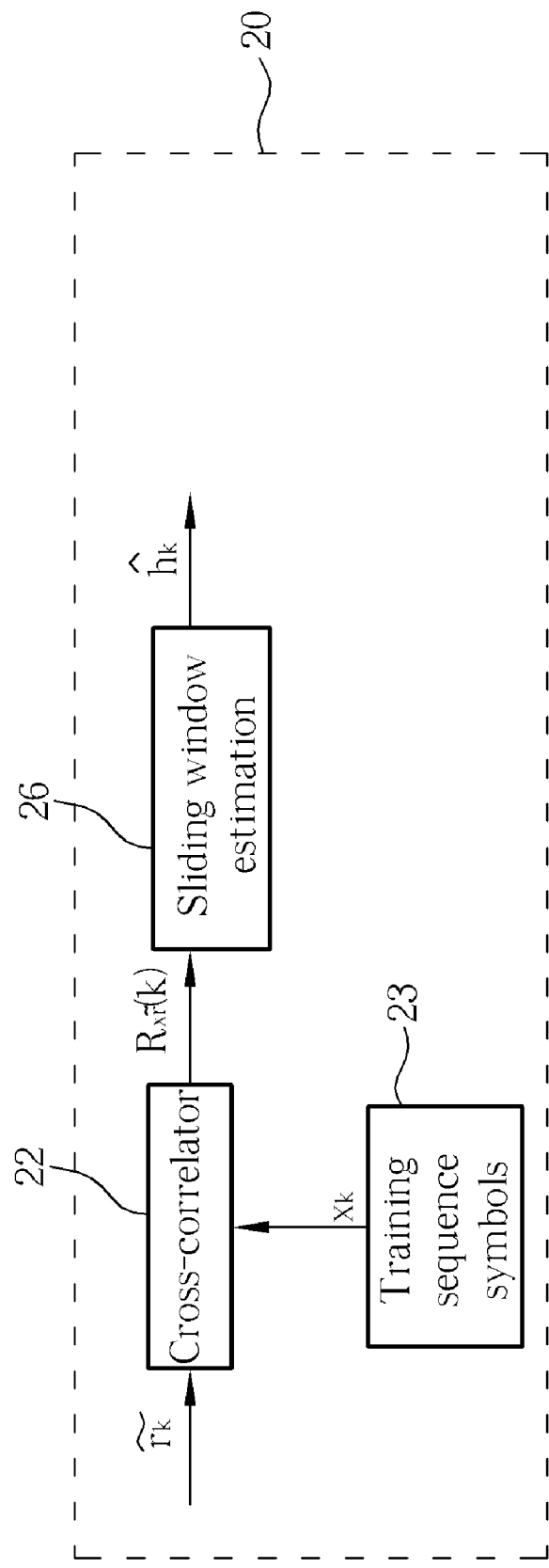
FIG. 2 is a block diagram of a second receiver of a communication system.

Please refer to FIG. 2. FIG. 2 is a block diagram of a second receiver 20 of a communication system. The radio receiver 20 includes a cross-correlator 22, and a training sequence symbol 23 coupled to the cross-correlator 22. The receiver 20 further includes a sliding window estimator 26 for calculating energy of an interval of a predetermined length according to the outputs of the cross-correlator 22, and for outputting the cross-correlation of the beginning time step index of which the interval of the predetermined length has the maximum energy and the succeeding time step indices. The functions of the cross-correlator 22 and the training sequence symbol 23 are identical to the functions of the cross-correlator 12 and the training sequence 13 in FIG. 1.

The definitions of $\tilde{r}_k$, $x_k$, k, L and $R_{X\tilde{Y}}(k)$, the outputs of the cross-correlator 22, are all identical to the relative definitions described above for illustrating FIG. 1. The sliding window estimator 26 is capable of calculating energy of an interval of a predetermined length. Assume the predetermined length is NT. The energy of the interval of the predetermined length NT is:

$$\sum_{m=0}^{N} |R_{x\tilde{r}}(i+4m)|^2 \quad \text{eq. (2)}$$

wherein N is the number of coefficients of the estimated channel impulse response, and i is the beginning time step index.

Assume when i=φ, the value of $$\sum_{m=0}^{N} |R_{x\tilde{r}}(i+4m)|^2$$

is at a maximum. In receivers, such as the receiver 20 illustrated in FIG. 2, $\tilde{r}_φ$ is set as the starting point of the training sequence of the received signals, and $\hat{h}_k = R_{x\tilde{r}}(φ+4k)$ is output as the estimated CIR.

The operation load of the aforementioned algorithm of estimating the CIR according to the energy of the interval of the predetermined length is higher than only performing cross-correlations since the aforementioned algorithm in FIG. 2 calculates energy besides performing cross-correlation. The starting point of the training sequence cannot be estimated according to the peak value of the modulus of the cross-correlations directly due to the shifting of the CIR in the fading channel. This problem is overcome with the aforementioned algorithm. However, when the transmitting channel is not a fading channel but an AWGN channel, the performance of the CIR estimation system will be degraded greatly due to the high operation load of calculating energy. This is because the noise in AWGN channels definitely affects the total energy; the peak value of the modulus of the cross-correlation of the training sequence and the received signals are not influenced. This peak reflects the location of the training sequence. Therefore, if the receiver illustrated in FIG. 2 is utilized to estimate the CIR in every kind of channel, the location of the training sequence estimation would not be accurate, and also the time load and operation load will increase, and more complex hardware will be required. Hence the total cost is higher.

Figure 3:
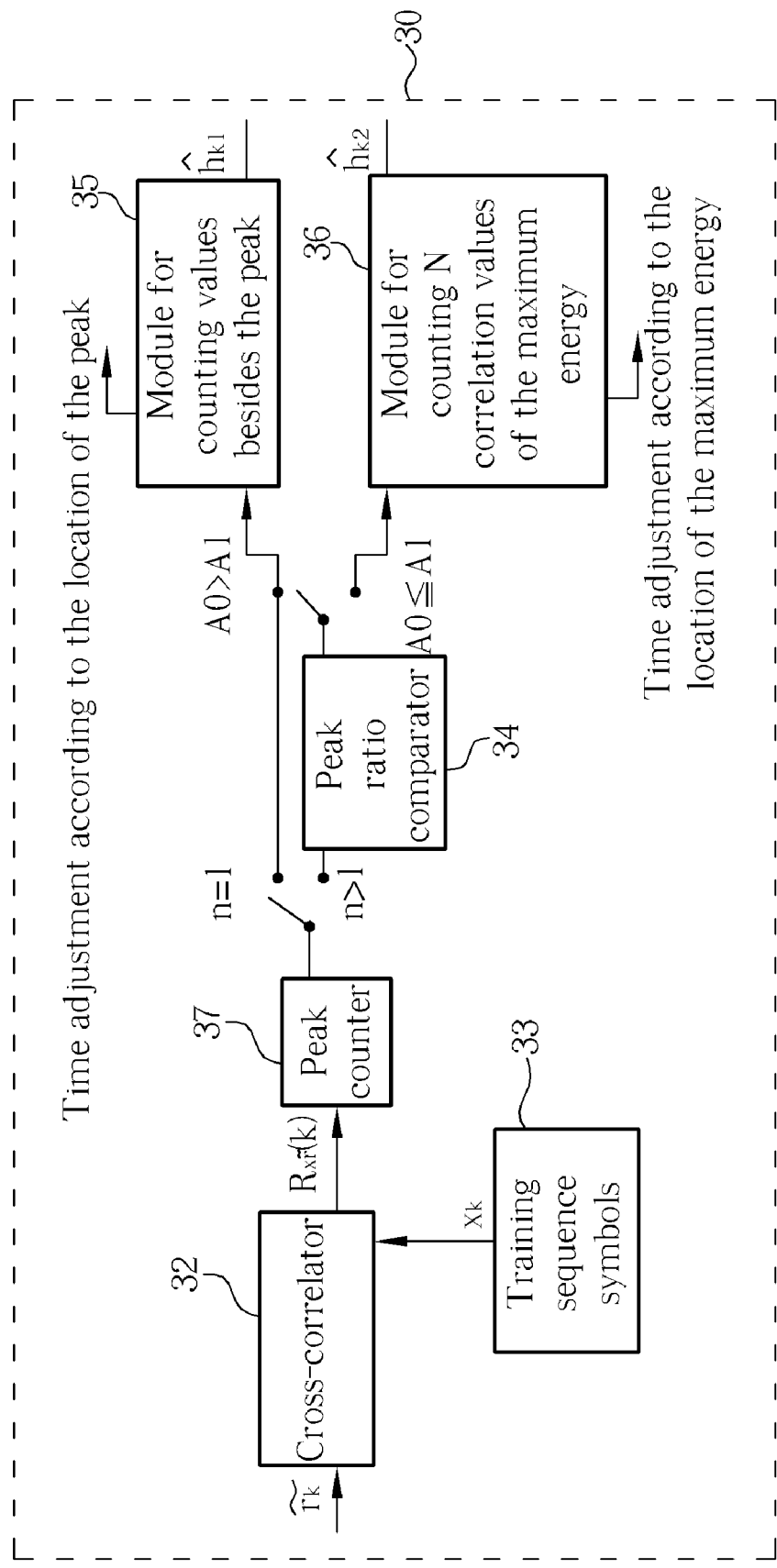
FIG. 3 is a block diagram of a receiver of a communication system of the present invention.

Please refer to FIG. 3. FIG. 3 is a block diagram of a receiver 30 of a communication system of the present invention. The radio receiver 30 includes a cross-correlator 32; a training sequence symbol 33 coupled to the cross-correlator 32; a peak counter 37 coupled to the cross-correlator 32 for counting the number of peak values of the outputs of the cross-correlator 32; and a peak ratio comparator 34 coupled to the peak counter 37 for calculating a ratio A0 of the maximum value and the second largest value among the squares of the modulus of the outputs of the cross-correlator 32, and comparing the ratio A0 with a predetermined value A1 if the number of peak values counted by the peak counter 37 is greater than one. The receiver 30 further includes a module 35 for counting and outputting values besides the peak and a module 36 for counting and outputting N correlation values of maximum energy. The module 35 for counting and outputting values besides the peak is coupled to the peak counter 37 and the peak ratio comparator 34. When the ratio A0 is greater than the predetermined value A1 or when there is only one peak value, the module 35 for counting and outputting values besides the peak is adopted to output the cross-correlation of the time step index of the maximum value and the time indices adjacent to the time step index of the maximum value as the CIR. The module 36 for counting and outputting N correlation values of maximum energy is coupled to the peak ratio comparator 34. On the other hand, when the ratio A0 is not greater than the predetermined value A1, the module 36 for counting and outputting N correlation values of maximum energy is used to calculate the energy of an interval of a predetermined length according to the outputs of the cross-correlator 32, and to output the cross-correlation of the beginning time step index of the interval of the predetermined length of which the energy is the maximum and the succeeding time step indices as the CIR. In FIG. 3, the function of the module 36 for counting and outputting N correlation values of maximum energy is identical to the function of the sliding window estimator 26 illustrated in FIG. 2. $\tilde{r}_k$ represents the samples of the received signals. It has been found in simulation of the present invention that samples of a higher sampling rate (by oversampling) cannot improve the performance of the estimation of CIR. Therefore, in the embodiment of the present invention, the bit period or the symbol period of the received signals is adopted as the sampling rate directly. $x_k$ stands for the original training sequence. k represents the time step index. L is the length of the training sequence. Similarly, the length of the samples $\tilde{r}_k$ should be longer than the training sequence $x_k$ and the samples $\tilde{r}_k$ should include the training sequence $x_k$ for detecting the location of the training sequence within the received signals. In other embodiments of the present invention $\tilde{r}_k$ can be designed as samples of the received signals with a sampling frequency which is a multiple of the bit rate or symbol rate of the received signals, as long as $x_k$ are from oversampling of the original training sequence with the same sampling frequency. $\tilde{r}_k$ can be a part of the samples of the received signals as well.

As described above, when signals are transmitted through an AWGN channel, the received energy will be affected by AWGN, but the location of the peak of the square of the modulus of the outputs of the cross-correlator 32 is not affected. Therefore, the CIR can be estimated according to the location of the peak. However, if the signals are transmitted through a fading channel, the location of the peak of the square of the modulus of the cross-correlations is shifted. The cross-correlations utilized to generate the estimated CIR should be decided according to the energy of an interval of a fixed length. Therefore, a method of comparing the ratio of the maximum value and the second largest value among the squares of the modulus of the cross-correlations in order to determine which algorithm is adopted to generate the estimated CIR. When the ratio of the maximum value and the second largest value, A0, is greater than a predetermined value A1, that is, the maximum value is much greater than the second largest value, it is determined that it is an AWGN channel that the signals are transmitted through. In this case, the peak ratio comparator 34 outputs the outputs of the cross-correlator 32 to the module 35 for counting and outputting values besides the peak. The module 35 for counting and outputting values besides the peak outputs the cross-correlations of the time step index of the maximum value and the time indices adjacent to the time step index of the maximum value from the cross-correlator 32 as the CIR. On the contrary, when the ratio A0 is not greater than the predetermined value A1, that is, the maximum value is not much greater than the second largest value, it is determined that it is a fading channel that the signals are transmitted through. For this situation, the peak ratio comparator 34 outputs the outputs from the cross-correlator 32 to the module 36 for counting and outputting N correlation values of the maximum energy. The module 36 calculates the energy of an interval of a predetermined length as the sliding window estimator 26 does in FIG. 2.

The predetermined length is assumed to be NT as well. The cross-correlation of the beginning time step index of which the interval of the predetermined length has the maximum energy and the succeeding time step indices are output as the estimated CIR. The predetermined value A1 utilized for comparison with the ratio of the maximum value and the second largest value is preferably set as eight. The output $\hat{h}_{k1}$ of the module 35 for counting and outputting values besides the peak and the output $\hat{h}_{k2}$ of the module 36 for counting and outputting N correlation values of the maximum energy are as below:

$$R_{x\tilde{r}}(k) = \frac{1}{L}\sum_{i=1}^{L} x_{L-i}^* \tilde{r}_{k+(L-i)}$$

$$\hat{h}_{k1} = \{R_{x\tilde{r}}(\gamma-2), R_{x\tilde{r}}(\gamma-1), R_{x\tilde{r}}(\gamma), R_{x\tilde{r}}(\gamma+1), R_{x\tilde{r}}(\gamma+2)\} \quad \text{eq. (3)}$$

wherein $\gamma$ is the value of k which makes the value of $|R_{xx}(k)|^2$ the maximum, and k is the time step index.

The CIR estimated by the module 35 for counting and outputting values besides the peak is symmetric with a center $R_{xx}(\gamma)$. According to the characteristic of GMSK modulation, this is approximate to pulse amplitude modulation (PAM). The training sequence symbols utilized in GSM systems are just GMSK modulated signals. Therefore the CIR of the training sequence symbols is bell-shaped symmetrical in a low-noise environment. Hence the estimated CIR can include $R_{xx}(\gamma)$ as the center and the symmetrical preceding and succeeding cross-correlations. In the present embodiment, due to the nature of GSM systems, the CIR can be chosen to include $R_{xx}(\gamma)$ and two preceding cross-correlations and two succeeding cross-correlations, that is, $R_{X\tilde{Y}}(\gamma-2)$, $R_{X\tilde{Y}}(\gamma-1)$, $R_{X\tilde{Y}}(\gamma)$, $R_{X\tilde{Y}}(\gamma+1)$, and $R_{X\tilde{Y}}(\gamma+2)$. When applied to other systems, the estimated CIR can include a different number of cross-correlations.

$$\tilde{h}_{k2} = \{R_{X\tilde{Y}}(\phi), R_{X\tilde{Y}}(\phi+1), R_{X\tilde{Y}}(\phi+2), R_{X\tilde{Y}}(\phi+3), R_{X\tilde{Y}}(\phi+4)\} \qquad \text{eq. (4)}$$

wherein $\phi$ is the value of k that makes the value of $$\sum_{m=0}^{N} |R_{x\tilde{F}}(k+m)|^2$$

a maximum, N is the number of coefficients of the estimated CIR, and k is the beginning time step index.

The estimated CIR output by the module 36 for counting and outputting N correlation values of the maximum energy is similar to the output of the sliding window estimator 26 of the receiver 20 in FIG. 2. $R_{X\tilde{Y}}(\phi)$ is taken as the beginning point of the CIR, and the four succeeding points, that is, $R_{X\tilde{Y}}(\phi+1)$, $R_{X\tilde{Y}}(\phi+2)$, $R_{X\tilde{Y}}(\phi+3)$, and $R_{X\tilde{Y}}(\phi+4)$ are adopted as well. Note that it is assumed in the present embodiment that there are five points needed for the estimated CIR. Similarly, the number of points succeeding $R_{X\tilde{Y}}(\phi)$ that are needed for generating the estimated CIR is dependent on the relative specification for different applications.

Figure 4:
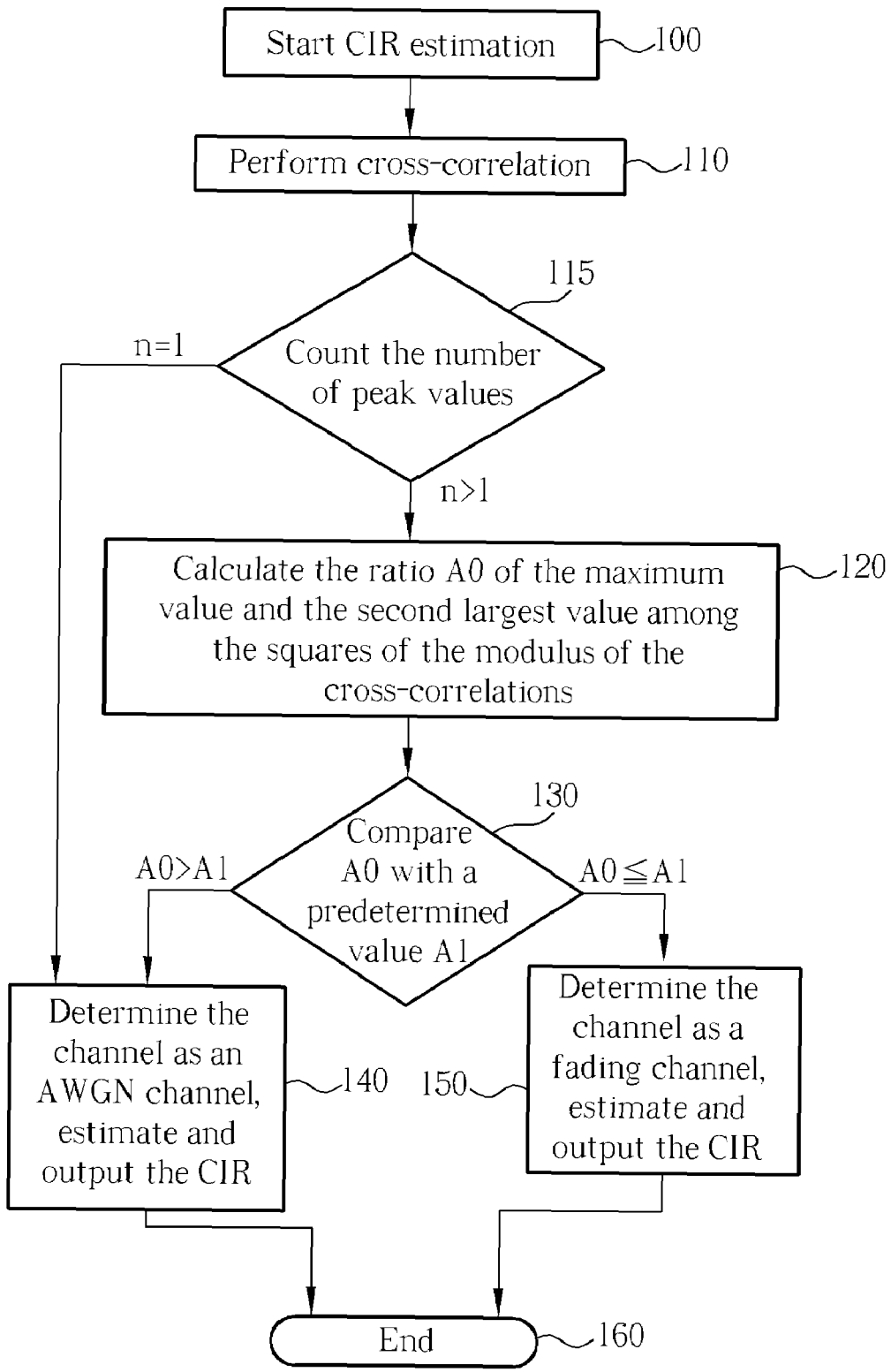
FIG. 4 is a flowchart of a method of the present invention for estimating CIR.

Please refer to FIG. 4. FIG. 4 is a flowchart of a method for channel impulse response estimation of CIR in a communication system of the present invention.

Step 100: Start CIR estimation;

Step 110: Perform a predetermined times of cross-correlations to samples of the training sequence stored in the memory and samples of the received signals;

Step 115: Count the number n of peak values; if n is one, go to Step 140; otherwise, go to Step 120;

Step 120: Calculate the ratio A0 of the maximum value and the second largest value among the squares of the modulus of the cross-correlations obtained in Step 110;

Step 130: Compare the ratio A0 with a predetermined value A1; if A0 is greater than A1, go to Step 140; otherwise, go to Step 150;

Step 140: Determine the channel as an AWGN channel, and output the time step index of the maximum value of the square of the modulus of the outputs of the cross-correlations in Step 110, and a predetermined number y of preceding cross-correlations and the predetermined number y of succeeding cross-correlations as the CIR; go to Step 110;

Step 150: Determine the channel as a fading channel, accumulate a predetermined number of the squares of modulus of the cross-correlations obtained in Step 110 in order to calculate the energy of an interval of a predetermined length, and output the beginning time step index of the interval of the predetermined length of which the energy is the maximum and 2y succeeding cross-correlations as the CIR;

Step 160: End.

In summary, the present invention introduces an apparatus and a related method for estimating the channel impulse response suitable for both AWGN channels and fading channels. The present invention is specifically suitable to GSM receivers, in which the maximum-likelihood sequence equalization (MLSE) algorithm is utilized. In the present invention, the characteristics of the AWGN channels and the fading channels are all addressed. A simple algorithm is utilized to determine which module is adopted to estimate the CIR. The receiver of the present invention estimates the CIR according to the peak value of the cross-correlations directly when the signals are transmitted through the AWGN channel. The performance of equalization is good enough and the operation load is limited. However, when the signals are determined as being transmitted through a fading channel, the present invention receiver estimates the CIR according to the energy of intervals. The present invention utilizes conventional algorithms of CIR estimation with a simple mechanism of determining whether the channel is an AWGN channel or a fading channel by comparing the ratio of the maximum value and the second largest value with a predetermined value, and adopts an appropriate estimation algorithm according to the channel. Therefore, the CIR is estimated precisely by the present invention receiver, no matter whether the channel is an AWGN channel or a fading channel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for estimating channel impulse response (CIR) in a communication system, the method comprising:
    (a) converting received RF analog signals to obtain baseband digitized signals, sampling the baseband digitized signals over a time according to a symbol period or a bit period, and cross-correlating at least part of the samples and a predetermined set of training sequence symbols;
    (b) calculating a ratio of a maximum value and a second largest value among squares of a modulus of outputs of the cross-correlations if there are a plurality of peak values among the outputs of the cross-correlation; and
    (c) if the ratio is larger than a first value, outputting the cross-correlation values as the CIR according to a time step index of which the cross-correlation is the maximum value and an adjacent time step indices.

2. The method of claim 1 further comprising:
    (d) calculating a number of peak values among the outputs of the cross-correlation.

3. The method of claim 1, wherein symbols adjacent to the symbol of which the time step index generates the maximum value are a second number of symbols preceding to the symbol of which the time step index generates the maximum value and the second number of symbols succeeding the symbol of which the time step index generates the maximum value.

4. The method of claim 3, wherein the second number is not less than two.

5. The method of claim 3, calculating energy of the interval of a predetermined length further comprising calculating squares of the modulus of the outputs of the cross-correlation, adjusting the time step indices of the cross-correlation in turn, and accumulating calculated squares for a third number, and setting the result of the accumulation as the energy of the interval of the predetermined length.

6. The method of claim 1, wherein the time according to the symbol period or the bit period is a time generated by dividing the symbol period or the bit period by a third integer.

7. The method of claim 6, wherein the third integer is four.

8. The method of claim 1, wherein the first value is an integer which is not less than four and not greater than eight.

9. A method for estimating channel impulse response (CIR) in a communication system, the method comprising:
    (a) converting received RF analog signals to obtain baseband digitized signals, sampling the baseband digitized signals over a time according to a symbol period or a bit period, and cross-correlating at least part of the samples and a predetermined set of training sequence symbols;

(b) calculating a ratio of a maximum value and a second largest value among squares of a modulus of outputs of the cross-correlations if there are a plurality of peak values among the outputs of the cross-correlation; and (c) if the ratio is not larger than a first value, calculating energy of an interval of a predetermined length according to the outputs of the cross-correlation, and outputting the cross-correlation value as the CIR according to a beginning time step index of the interval of the predetermined length of which the energy is the maximum and the time step indices following the beginning time step index.

10. The method of claim 9 further comprising:

(d) calculating a number of peak values among the outputs of the cross-correlation.

11. The method of claim 9, wherein symbols adjacent to the symbol of which the time index is the beginning time step index of the interval of the predetermined length of the maximum energy are twice as many as a second number of symbols after the symbol of which the time index is the beginning time step index of the interval of the predetermined length of the maximum energy.

12. The method of claim 11, wherein the second number is not less than two.

13. The method of claim 9, wherein calculating the energy of the interval of the predetermined length comprises calculating squares of the modulus of the outputs of the cross-correlation, adjusting the time step indices of the cross-correlation in turn, accumulating calculated squares for a third number, and selling the result of the accumulation as the energy of the interval of the predetermined length.

14. The method of claim 9, wherein the time according to the symbol period or the bit period is a time generated by dividing the symbol period or the bit period by a third integer.

15. The method of claim 14, wherein the third integer is four.

16. The method of claim 9, wherein the first value is an integer which is not less than four, and not greater than eight.

17. A receiver of a communication system, the receiver comprising:

a memory for storing a predetermined set of training sequence symbols;

a cross-correlator coupled to the memory for performing a predetermined cross-correlation to samples of received symbols and the predetermined set of training sequence symbols;

a peak counter for counting a number of peak values among outputs of the cross-correlator;

a peak ratio comparator coupled to the peak counter for comparing a ratio of a maximum value and a second largest value among a squares of a modulus of outputs of the cross-correlator with a first value if there are a plurality of peak values among the outputs of the cross-correlator;

a module for counting values besides the peak, the module coupled to the peak counter and the peak ratio comparator for outputting the symbol of which the cross-correlator outputs the maximum value according to a time step index and symbols adjacent to the symbol as CIR when there is only one peak value according to the outputs of the cross-correlator or when there are a plurality of peak values among the outputs of the cross-correlator but the ratio of the maximum square of the modulus (power) value and the second largest square of the modulus (power) value among the outputs of the cross-correlator is larger than the first value; and a module for counting N correlation values of a maximum energy, the module coupled to the peak ratio comparator for calculating energy of an interval of a predetermined length according to the outputs of the cross-correlator, and outputting the symbol of which the time step index is the beginning time step index of the interval of the predetermined length of the maximum energy and the adjacent symbols as CIR when there are a plurality of peak values among the outputs of the cross-correlator and the ratio of the maximum square of the modulus (power) value and the second largest square of the modulus (power) value among the outputs of the cross-correlator is not larger than the first value.

18. The receiver of claim 17, wherein the symbols of which the time step indices are adjacent to the time step index of the symbol of the maximum output of the cross-correlator are a second number of symbols preceding to the symbol of the maximum output of the cross-correlator and the second number of symbols succeeding to the symbol of the maximum output of the cross-correlator.

19. The receiver of claim 18, wherein the symbols adjacent to the symbol of which the time step index is the beginning time step index of the interval of the predetermined length of the maximum energy are twice as many as a second number of symbols after the symbol of which the time step index is the beginning time step index of the interval of the predetermined length of the maximum energy.

20. The receiver of claim 17, wherein the module for counting N correlation values of the maximum energy is capable of calculating squares of the modulus of the outputs of the cross-correlator, adjusting the time step indices of the symbols in turn, accumulating calculated squares for a third number, and setting the result of the accumulation as the energy of the interval of the predetermined length.

21. The receiver of claim 17, wherein the first value is an integer which is not less than four and not greater than eight.

22. The receiver of claim 17, wherein the second number is not less than two.

23. The receiver of claim 17, wherein the communication system is a global system for mobile communications (GSM) system.

* * * * *